US007491333B1

(12) United States Patent  (10) Patent No.: US 7,491,333 B1
Luke et al.  (45) Date of Patent: Feb. 17, 2009

(54) INDUSTRIAL WASTE WATER TREATMENT PROCESS

(75) Inventors: Donald A. Luke, Highland City, FL (US); Vaughn V. Astley, Highland City, FL (US)

(73) Assignee: Cleanwater Technologies, LLC, Valrico, FL (US)

( * ) Notice: Subject to any disclaimer, the term of this patent is extended or adjusted under 35 U.S.C. 154(b) by 0 days.

(21) Appl. No.: 11/736,144

(22) Filed: Apr. 17, 2007

Related U.S. Application Data

(63) Continuation of application No. 11/610,904, filed on Dec. 14, 2006, now abandoned.

(60) Provisional application No. 60/597,630, filed on Dec. 14, 2005.

(51) Int. Cl.
  *C02F 1/52* (2006.01)
(52) U.S. Cl. .................. 210/638; 210/639; 210/712; 210/713; 210/718; 210/724; 210/726; 210/747; 210/803; 210/804; 210/906; 210/915
(58) Field of Classification Search .................. 210/713
  See application file for complete search history.

(56) References Cited

U.S. PATENT DOCUMENTS

| | | | | |
|---|---|---|---|---|
| 3,822,788 | A | * | 7/1974 | Dunkers et al. ............. 210/200 |
| 4,142,970 | A | * | 3/1979 | von Hagel et al. ........... 210/738 |
| 4,320,012 | A | * | 3/1982 | Palm et al. .................. 210/713 |
| 4,376,048 | A | * | 3/1983 | Kovacs .................... 210/221.1 |
| 4,388,195 | A | * | 6/1983 | von Hagel et al. .......... 210/709 |
| 4,657,680 | A | * | 4/1987 | Zibrida ........................ 210/713 |

(Continued)

*Primary Examiner*—Peter A Hruskoci

(74) *Attorney, Agent, or Firm*—Thomas E. Toner; Smith & Hopen, P.A.

(57) ABSTRACT

A process for the treatment of industrial waste water. The process includes the steps of admixing partially-treated waste water containing precipitated impurities with a flocculating agent in a flocculation basin, directing the admixed waste water to an elongated sedimentation basin, allowing flocculated solids in the waste water to settle to the bottom of the sedimentation basin, removing the settled solids from the bottom of the sedimentation basin and directing the treated water from the sedimentation basin. The process can further include the step of adjusting the pH of the waste water to precipitate impurities in the waste water prior to the addition of the flocculation agent. The elongated sedimentation basin can include a pair of sloped sides to consolidate the settled solids at the bottom of the basin. The settled solids can then be removed by suction. The basins can be formed from the excavation or impoundment of earth in an area adjacent to a waste water-generating facility. Furthermore, the flow of the streams between basins can be controlled by overflow, with flow rates further controlled by recycle of solids and treated water. The treatment of industrial water according to the present processes allows removal of impurities such that the water is suitable for internal re-use in an operating phosphoric acid facility or release. Additionally, the process is able to treat acidic industrial waste water by the removal of impurities as a preliminary treatment stage leading to discharge of the final treated water to natural water bodies in compliance with the Federal Clean Water Act. Moreover, treated water may be processed by reverse osmosis to remove residual impurities. By employing the processes taught herein reverse osmosis becomes possible and practicable in the context of industrial waste water treatment. Treatment of waste water in accordance with the present invention will require less expensive capital equipment for the separation stages and provide a more concentrated solids stream.

40 Claims, 6 Drawing Sheets

U.S. PATENT DOCUMENTS

| | | | | |
|---|---|---|---|---|
| 4,710,290 A * | 12/1987 | Briltz | | 210/199 |
| 4,927,543 A * | 5/1990 | Bablon et al. | | 210/711 |
| 5,370,800 A * | 12/1994 | Stevenson | | 210/710 |
| 5,755,973 A * | 5/1998 | Krieger | | 210/704 |
| 5,770,091 A * | 6/1998 | Binot et al. | | 210/711 |
| 5,772,885 A * | 6/1998 | Sarrouh | | 210/523 |
| 6,234,323 B1 * | 5/2001 | Sarrouh | | 210/523 |
| 6,371,308 B1 * | 4/2002 | Zhou | | 210/519 |
| 6,447,686 B1 * | 9/2002 | Choi et al. | | 210/666 |
| 6,689,277 B2 * | 2/2004 | Streat | | 210/711 |
| 7,284,670 B2 * | 10/2007 | Schmid | | 210/523 |

* cited by examiner

INDUSTRIAL WASTE WATER TREATMENT PROCESS

CROSS REFERENCE TO RELATED APPLICATIONS

This application is a continuation of pending U.S. Nonprovisional patent application Ser. No. 11/610,904, entitled, "Industrial Water Waste Treatment Process," filed Dec. 14, 2006, which claims priority to This application claims priority to currently pending U.S. Provisional Patent Application 60/597,630, entitled, "Treatment of Phosphoric Acid Plant Pond Water", filed Dec. 14, 2005, the contents of which are herein incorporated by reference.

FIELD OF INVENTION

This invention relates to the treatment of industrial waste water. More specifically, this invention relates to the treatment of the industrial water to remove impurities such that the water is suitable for internal re-use in an operating phosphoric acid facility or release. Most specifically, the process is further able to treat acidic industrial waste water by the removal of impurities as a preliminary treatment stage leading to discharge of the final treated water to natural water bodies in compliance with the Federal Clean Water Act.

BACKGROUND OF THE INVENTION

Production of phosphoric acid by what is commonly known as the "wet process" involves the reaction of finely ground phosphate rock with sulfuric acid. As a result of the various reactions, a slurry is produced containing phosphoric acid, calcium sulfate and various impurities derived from the phosphate rock. The slurry is normally filtered to separate the phosphoric acid product from the by-product calcium sulfate. The phosphoric acid obtained is then used in the production of various phosphate fertilizers, such as ammoniacal fertilizers, via neutralization of the acid with ammonia.

Several varieties of wet process production of phosphoric acid are utilized around the world. The most commonly employed is the Di-Hydrate process, in which a specific crystalline form of calcium sulfate is produced by reaction of the calcium present in the raw phosphate ore and sulfuric acid used to acidulate the ore. Approximately 5 tons of calcium sulfate, or gypsum, are formed per ton of phosphate ($P_2O_5$) produced.

Water is normally used to wash the calcium sulfate filter cake and thereby increase the recovery of the phosphoric acid product. Most of this wash water is fed back into the phosphoric acid production process as make-up water. However, a portion of this water, together with some residual phosphoric acid, remains trapped in the calcium sulfate filter cake and is discharged from the filter with the filter cake. The trapped water contains several percent of phosphoric acid and small amounts of other impurities that were present in the phosphoric acid product. Additional water is normally used to help discharge the calcium sulfate filter cake off of the filter. Large volumes of water are then used to transport the calcium sulfate filter cake by pumping as a slurry to a storage or disposal area.

At the storage or disposal area the calcium sulfate will settle and the excess transportation water will be liberated. This liberated water will normally be collected in a system of channels and ponds and recycled to the phosphoric acid production plant for reuse. The pond water is used for washing the calcium sulfate filter cake and for cooling and scrubbing process vapors. The water can also be used in grinding the rock to produce a slurry and other purposes connected with the plant that do not require fresh water. These channels and ponds also serve as a collection site for other water that is used in and around the phosphoric acid plant, such as for cleaning or washing, fresh water fume scrubbers, and as a collection site for phosphoric acid spills or leaks within the plant. Also, since these channels and ponds are located outside, they collect rain water.

The water contained within these channels and ponds contains small amounts of phosphoric acid and other impurities normally present in the phosphoric acid. Consequently, it is considered contaminated. Most particularly, the recycled or process water contains about 0.25% to 3% phosphoric acid, similar amounts of fluoride species, several hundred milligrams per liter of soluble ammonia, and trace amounts of many heavy and toxic metals. Thus, it is really not water in the traditional sense, but rather a weak but very acidic solution. Before the water can be released to the environment, it must be treated or purified to remove the phosphoric acid and other impurities. In some cases, in an efficiently operated phosphoric acid plant, in the absence of severe weather conditions, a balance will exist between water input to the pond system and water evaporation such that virtually all of this contaminated water can be recycled and used within the plant. In this case, treatment and discharge of the contaminated water, commonly known as pond water, is not necessary.

However, there are circumstances under which treatment and discharge of the contaminated pond water is necessary. One such circumstance could be an extended period of abnormally heavy rainfall. When the climatic cycle is such that rainfall and evaporation do not match, and one significantly outweighs the other, such as in the case of significant storm events or a drought, the process water balance is severely impacted. Of greatest consequence is the situation where several storms cause the collection and mixing of large quantities of storm water with the process water and raising of the water inventories to unsafe levels. Environmental damage can occur if the process water is abruptly discharged into local streams and rivers. Thus, it is necessary to routinely reduce excessive contaminated water (pond water) inventories to prevent its accidental discharge and the attendant environmental impact. Another circumstance indicating treatment and discharge would be when the phosphoric acid plant has ceased operation either for an extended period of time or permanently.

Many factors influence the specific components and their concentrations in this contaminated pond water. While it cannot be said that there is any typical composition for pond water some of the major chemical components that could be found in pond water, and an example of their range of concentrations, are as follows:

| CHEMICAL COMPONENT | RANGE OF CONCENTRATION |
|---|---|
| P | 1000-12,000 ppm |
| $SO_4$ | 4300-9600 ppm |
| F | 50-15,000 ppm |
| Si | 30-4100 ppm |
| (ammoniacal) N | 40-1500 ppm |
| Na | 1200-2500 ppm |
| Mg | 160-510 ppm |
| Ca | 450-3500 ppm |
| K | 80-370 ppm |
| Fe | 5-350 ppm |
| Al | 10-430 ppm |
| Cl | 10-300 ppm |

Normally the major acidic components of pond water are phosphoric acid and sulfuric acid, with lesser amounts of hydrofluorosilicic acid ($H_2SiF_6$), and hydrofluoric acid (HF). In an operating phosphoric acid complex, the pond water is normally saturated or supersaturated with respect to many of the ions contained within it. The only exception would be immediately after a period of extremely heavy rainfall. Also, since the pond water is used for cooling it undergoes continuous thermal cycling (heating and cooling). This thermally cycled water, along with the addition of some waste fresh water to the pond water, is why the pond water can function as an effective scrubbing fluid for some process gasses. One method of treating or purifying this pond water that has, until now, been the industry standard is well known in the art is double liming. This method consists of adding a calcium compound (such as $CaCO_3$, $Ca(OH)_2$ or $CaO$) to the pond water, in two stages, such that the fluoride, phosphate and other impurities form solid precipitates that settle and are separated from the thus purified water. This method is described in Francis T. Nielsson, ed., Manual of Fertilizer Processing, Marcel Dekker, Inc. (1987), pp. 480 to 482; G. A. Mooney, et al., Removal of Fluoride and Phosphorus from Phosphoric Acid Wastes with Two Stage Line Treatment, Proceedings of the 33rd Industrial Waste Conference, Purdue Univ. (1978); G. A. Mooney et al., Laboratory and Pilot Treatment of Phosphoric Acid Wastewaters, presented at the Joint Meeting of Central Florida and Peninsular, Florida A.I.Ch.E. (1977); and U.S. Pat. Nos. 5,112,499; 4,698,163; 4,320,012; 4,171,342; 3,725,265 and 3,551,332.

During the first stage lime treatment, lime is added to a pH of about 4-5, resulting in the precipitation of fluoride as $CaF_2$ and/or $CaSiF_6$. During this stage it is also thought that the hydrofluorosilicic acid present dissociates to HF and $SiF_4$, with the SiF4 hydrolyzing to HF and $SiO_2$. Some phosphate is also precipitated at this stage as $Ca_3(PO_4)_2$ (calcium phosphate), as well as some CaSO4, (calcium sulphate). The sludge ($CaF_2$, $CaSiF_6$, $Ca_3(PO4)_2$ and other compounds) produced at this stage is a granular, crystalline material that settles fairly rapidly and can be de-watered to about 30% solids in a gravity thickener. The sludge can be sent to the plant gypsum stack or recycled to the phosphoric acid plant for recovery of the phosphate.

In the second stage, additional lime is added to the clarified liquid from the first stage to a pH of about 8-10. In this stage the remaining phosphates and fluorides are precipitated along with sulfate and many of the metals. The sludge in this stage has poor settling and thickening properties, due to the hydroxide nature of many of the compounds, and rarely achieves more than 5%-7% solids by weight. The sludge from this stage is normally deposited in large lagoons to allow for additional de-watering. In the treatment of process water containing unacceptable levels of soluble ammonia, the second stage system can be operated at a higher pH, from pH 10 to 12, to increase the un-ionized ammonia concentration, raising its volatility. The increased vapor pressure of the ammonia in solution facilitates its removal through air stripping by the addition of spray devices located in or floating on the sedimentation lagoon. Even without the addition of a spray system, operation of the treatment lagoon at a pH of 9 to 10 or greater results in the removal of ammonia through volatilization due to the large surface area available for such activity.

$2NH_4^+ + OH = H_2O + NH_3$ (Unionized and volatile)

The quantity of clear water that can be obtained from a double liming process is about 50%-70% of the feed volume. As an alternative, liming procedures can be carried out in a single stage.

However, there are several problems associated with this method. One problem is the large volume of sludge produced. Sludge (i.e., a mixture of the precipitated impurities, un-reacted calcium compound and water) is produced in both the first and second stages of this process. These sludge materials, some of which de-water slowly, are normally deposited in settling ponds that require large land areas. Another significant problem with this treatment process is that very large volumes of lime are required to neutralize the acidic pond waters, some of which can have a pH as low as one.

Another general method of water purification is reverse osmosis. This process is based on the application of external pressure on an aqueous salt solution in contact with a semi permeable membrane, such that the applied pressure exceeds the osmotic pressure of the water component of the solution in contact with the membrane. Thus, some of the water is forced through the membrane in the reverse direction, while the other components in the solution (i.e., soluble salts) do not pass through the membrane. This results in a stream of purified water, known as permeate, and a stream of increased salt content, known as the reject or concentrate. Reverse osmosis is well known in the art and is described in Douglas M. Ruthven, ed., Encyclopedia of Separation Technology, Volume 2, pp. 1398-1430, John Wiley & Sons, Inc. (1997); S. Sourirajan and T. Matssuura, Reverse Osmosis/Ultrafiltration Principles, National Research Council of Canada, Ottawa, Canada (1985); B. Parekh, ed., Reverse Osmosis Technology, Marcel Dekker, Inc., New York (1988); R. Rautenbach and R. Albrecht, Membrane Processes, John Wiley & Sons, Inc., New York (1989) and other publications. Reverse osmosis is also described in a variety of U.S. patents, for example, U.S. Pat. Nos. 4,110,219; 4,574,049; 4,876,002; 5,006,234; 5,133, 958 and 6,190,558.

Several attempts have been made to use reverse osmosis for the purification of contaminated phosphoric acid plant pond water. However, these attempts have generally failed due to the fact that the pond water is a saturated solution. Thus, as soon as any water is removed from the pond water the solution becomes supersaturated and salts precipitate and quickly clog the membranes used in reverse osmosis and prevent additional pure water from flowing through them. Also, even when the pond water was from a closed plant where rainwater had diluted it below saturation levels, an R.O. system can only remove a relatively small amount of purified water from the pond water before it again becomes a saturated solution. The use of anti-scalants can mitigate to some degree the scaling tendencies, but yields are often no more than 25% and frequent cleaning of the membranes is still required.

However, in an idle plant or at a phosphoric manufacturing facility being permanently closed, and where there is no adjacent operational facility, the concentrated reject stream has no home and no commercial value due to its dilute concentration. Typically it is returned to the pond system and must be re-processed by lime neutralization. Thus the overall consumption of lime to neutralize the water is unchanged whether the pond water is treated conventionally by double liming or is separated at an intermediate point and the reject stream further neutralized by lime. Thus there is no reduction in lime consumption by applying reverse osmosis technology in a non-operating facility.

A long-felt but unfulfilled need addressed by the present invention is to provide a process for the treatment of phosphate production waste acidic process water that will require less expensive capital equipment being required for the various separation stages and provide a more concentrated solids stream.

SUMMARY OF INVENTION

The present invention provides a process for the treatment of waste water. The process enables the large-scale treatment of water to facilitate its reuse or release into the environment. The process requires less expensive capital expenditures for implementation and results in a more concentrated solids stream.

According to the present invention, the foregoing and other objects and advantages are attained by a process for treatment of waste water. In accordance with an aspect of the invention the process includes the steps of admixing partially-treated waste water containing precipitated impurities with a flocculating agent in a flocculation basin, directing the admixed waste water to an elongated sedimentation basin, allowing flocculated solids in the waste water to settle to the bottom of the sedimentation basin, removing the settled solids from the bottom of the sedimentation basin and directing the clarified water from the sedimentation basin.

In certain embodiments the elongated sedimentation basin comprises a pair of sloped sides to consolidate the settled solids at the bottom of the basin. In certain embodiments the sedimentation basin is substantially rectangular in shape when viewed from above and comprises a pair of sloped sides to consolidate the settled solids at the bottom of the basin. The sloped sides may meet at the bottom of the basin. Alternatively, the sloped sides may slope towards one-another as the sides approach the bottom of the basin with the sides terminating around the bottom of the basin and separated by a flat section or the like forming the bottom of the basin. The sloping sides are preferably along the elongated extent of the basin.

In certain embodiments the admixed waste water is directed to the sedimentation basin by overflow from the flocculation basin. The overflow from the flocculation basin can be controlled by controlling the flow into the flocculation basin.

In certain embodiments the sedimentation basin is free of the presence of rakes to move or consolidate solids. In further embodiments the sedimentation basin is free of mechanical devices within the sedimentation basin to move solids. In still further embodiments the sedimentation basin is free of mechanical devices within the sedimentation basin to move solids to the suction pipes. In still further embodiments the sedimentation basin is free of the presence of rakes, submerged chain drag conveyors, or the like to move or consolidate solids.

In certain embodiments a plurality of suction devices is arranged along the longitudinal axis of the sedimentation basin to remove settled solids from the bottom of the basin. In specific embodiments the suction device is a positive displacement withdrawal device. It is found that such a withdrawal device minimizes degradation of the flocculating agent in the removed solids. In further embodiments the process includes one or more suction devices moveably affixed to enable deployment of the devices along the longitudinal axis of the sedimentation basin to remove settled solids from the bottom of the basin. In this manner, the suction pipes can be moved along the length of the basin to perform suction at various points as needed.

In certain embodiments the sedimentation basin is formed from the excavation or impoundment of earth in an area adjacent to a waste water-generating facility. By forming the basin by impoundment or excavation of earth the capital cost of creating the basin is significantly reduced.

In certain embodiments the flocculation basin has sides substantially equidistant from the center of the basin and a diameter at least about three times the depth of the basin. In specific embodiments the diameter of the flocculation basin is less than about twenty times the depth of the basin.

In certain embodiments the width of the sedimentation basin is about 3 to about 20 times the diameter of the flocculation basin. In further embodiments the sedimentation basin is about 5 to about 10 times the diameter of the flocculation basin.

In certain embodiments the length of the sedimentation basin is about 5 to about 50 times the diameter of the flocculation basin. In further embodiments the length of the sedimentation basin is about 10 to about 20 times the diameter of the flocculation basin.

In certain embodiments the process further includes the step of adjusting the pH of the waste water to precipitate impurities in the waste water prior to the addition of the flocculation agent. Adjusting the pH includes increasing or decreasing the pH. Increasing or decreasing the pH depends upon the acidity or alkalinity of the wastewater to be treated. One would adjust the pH to effect the precipitation of impurities in the wastewater, to allow the removal of these impurities. For instance, when dealing with acidic wastewater such as that from a wet process plant, one could add lime to effect the precipitation of impurities. In certain embodiments the process further includes the step of recycling the removed solids into waste water to be treated. The recycled solids can thus be used to adjust the pH of the wastewater. In still further embodiments the step of adjusting the pH of the water is performed by the addition of a base in a quantity sufficient to result in a pH of about 9.0 to about 12.0 and the process further includes the step of holding the water in the sedimentation basin to allow volatilization of ammonia in the water. Air-stripping can be used water being held facilitate/speed up the volatilization of ammonia.

In certain embodiments the process further includes the step adding an acid to the treated water to adjust the pH of the treated water toward neutrality. The acid used can be sulfuric acid. An acid would be added to treated water of alkaline nature, thus bringing the water toward neutrality, preferably in the range of 6.5 to 8. In contrast, where the treated water is acidic, one would add a base to the treated water to adjust it towards neutrality. These steps would be performed in situations such as preparing the treated water for release into the environment or reuse of the water where relatively neutral water is required.

In certain embodiments the treated water is processed by reverse osmosis to remove residual impurities. By employing the processes taught herein reverse osmosis becomes possible and practicable in the context of industrial waste water treatment. The waste water streams entering the processes are typically saturated or supersaturated with respect to impurities and contaminants. The processes of the invention effect the removal of these impurities and contaminants that would otherwise frustrate efforts to perform reverse osmosis.

In accordance with another aspect of the invention the process for the treatment of waste water includes the steps of adjusting the pH of the waste water to precipitate impurities, admixing the waste water containing the precipitated impurities with a flocculating agent in a flocculation basin, directing the admixed waste water to an elongated sedimentation basin, allowing flocculated solids in the waste water to settle to the bottom of the sedimentation basin, removing the settled solids from the bottom of the sedimentation basin and directing the clarified water from the sedimentation basin.

In certain embodiments the elongated sedimentation basin comprises a pair of sloped sides to consolidate the settled solids at the bottom of the basin. In certain embodiments the sedimentation basin is substantially rectangular in shape when viewed from above and comprises a pair of sloped sides to consolidate the settled solids at the bottom of the basin. The sloped sides may meet at the bottom of the basin. Alternatively, the sloped sides may slope towards one-another as the sides approach the bottom of the basin with the sides terminating around the bottom of the basin and separated by a flat section or the like forming the bottom of the basin. The sloping sides are preferably along the elongated extent of the basin.

In certain embodiments the admixed waste water is directed to the sedimentation basin by overflow from the flocculation basin. The overflow from the flocculation basin can be controlled by controlling the flow into the flocculation basin.

In certain embodiments the sedimentation basin is free of the presence of rakes to move or consolidate solids. In further embodiments the sedimentation basin is free of mechanical devices within the sedimentation basin to move solids. In still further embodiments the sedimentation basin is free of mechanical devices within the sedimentation basin to move solids to the suction pipes. In still further embodiments the sedimentation basin is free of the presence of rakes, submerged chain drag conveyors, or the like to move or consolidate solids.

In certain embodiments a plurality of suction devices is arranged along the longitudinal axis of the sedimentation basin to remove settled solids from the bottom of the basin. In specific embodiments the suction device is a positive displacement withdrawal device. It is found that such a withdrawal device minimizes degradation of the flocculating agent in the removed solids. In further embodiments the process includes one or more suction devices moveably affixed to enable deployment of the devices along the longitudinal axis of the sedimentation basin to remove settled solids from the bottom of the basin. In this manner, the suction pipes can be moved along the length of the basin to perform suction at various points as needed.

In certain embodiments the sedimentation basin is formed from the excavation or impoundment of earth in an area adjacent to a waste water-generating facility. By forming the basin by impoundment or excavation of earth the capital cost of creating the basin is significantly reduced.

In certain embodiments the flocculation basin has sides substantially equidistant from the center of the basin and a diameter at least about three times the depth of the basin. In specific embodiments the diameter of the flocculation basin is less than about twenty times the depth of the basin.

In certain embodiments the width of the sedimentation basin is about 3 to about 20 times the diameter of the flocculation basin. In further embodiments the sedimentation basin is about 5 to about 10 times the diameter of the flocculation basin.

In certain embodiments the length of the sedimentation basin is about 5 to about 50 times the diameter of the flocculation basin. In further embodiments the length of the sedimentation basin is about 10 to about 20 times the diameter of the flocculation basin.

In certain embodiments the process further includes the step of recycling the removed solids into waste water to be treated. The recycled solids can thus be used to adjust the pH of the wastewater. For instance, where lime or other alkaline substance had been used to adjust the pH, the solids will contain significant amounts of residual lime or other alkaline substances that will effectively raise the pH of the liquid to which they are recycled into.

In still further embodiments the step of adjusting the pH of the water is performed by the addition of a base in a quantity sufficient to result in a pH of about 9.0 to about 12.0 and further includes the step of holding the water in the sedimentation basin to allow volatilization of ammonia in the water. Air-stripping can be used water being held facilitate/speed up the volatilization of ammonia.

In certain embodiments the process further includes the step adding an acid to the treated water to adjust the pH of the treated water toward neutrality. The acid used can be sulfuric acid. An acid would be added to treated water of alkaline nature, thus bringing the water toward neutrality, preferably in the range of 6.5 to 8. In contrast, where the treated water is acidic, one would add a base to the treated water to adjust it towards neutrality. These steps would be performed in situations such as preparing the treated water for release into the environment or reuse of the water where relatively neutral water is required. In certain embodiments the treated water is processed by reverse osmosis to remove residual impurities.

In accordance with another aspect of the invention the process for the treatment of waste water includes the steps of adjusting the pH of the waste water, admixing a flocculating agent with the waste water in a flocculation basin, directing the flocculated waste water to an elongated sedimentation basin, allowing solids in the flocculated waste water to settle to the bottom of the sedimentation basin, removing the settled solids from the bottom of the sedimentation basin, directing the first-stage clarified water from the sedimentation basin to a reaction vessel, adjusting the pH of the first-stage clarified water in a reaction vessel, admixing a flocculating agent with the first-stage clarified water in a flocculation basin, directing the flocculated water to an elongate sedimentation basin, allowing solids in the flocculated water to settle to the bottom of the sedimentation basin, removing the settled solids from the bottom of the sedimentation basin and directing the treated water from the sedimentation basin.

In certain embodiments the pH is adjusted in at least one of the pH increasing steps by the addition of lime. In certain embodiments the step of adjusting the pH of the waste water is performed by the addition of a base in a quantity sufficient to result in a pH of about 3.0 to about 5.0. In certain embodiments the step of adjusting the pH of the first-stage clarified water is performed by the addition of a base in a quantity sufficient to result in a pH of about 8.0 to about 10.0. In alternative embodiments the step of adjusting the pH of the first-stage clarified water is performed by the addition of a base in a quantity sufficient to result in a pH of about 9.0 to about 12.0 and the process further includes the step of holding the water in the sedimentation basin to allow volatilization of ammonia in the water.

In certain embodiments the process further includes the step adding an acid to the treated water to adjust the pH of the treated water toward neutrality. The acid used can be sulfuric acid. An acid would be added to treated water of alkaline nature, thus bringing the water toward neutrality, preferably in the range of 6.5 to 8. In contrast, where the treated water is acidic, one would add a base to the treated water to adjust it towards neutrality. These steps would be performed in situations such as preparing the treated water for release into the environment or reuse of the water where relatively neutral water is required. In certain embodiments the treated water is processed by reverse osmosis to remove residual impurities.

In certain embodiments the process further includes the step of recycling the removed solids into waste water to be treated. The recycled solids can thus be used to adjust the pH of the wastewater.

In certain embodiments the elongated sedimentation basin comprises a pair of sloped sides to consolidate the settled solids at the bottom of the basin. In certain embodiments the sedimentation basin is substantially rectangular in shape when viewed from above and comprises a pair of sloped sides to consolidate the settled solids at the bottom of the basin. The sloped sides may meet at the bottom of the basin. Alternatively, the sloped sides may slope towards one-another as the sides approach the bottom of the basin with the sides terminating around the bottom of the basin and separated by a flat section or the like forming the bottom of the basin. The sloping sides are preferably along the elongated extent of the basin.

In certain embodiments the admixed waste water is directed to the sedimentation basin by overflow from the flocculation basin. The overflow from the flocculation basin can be controlled by controlling the flow into the flocculation basin.

In certain embodiments the sedimentation basin is free of the presence of rakes to move or consolidate solids. In further embodiments the sedimentation basin is free of mechanical devices within the sedimentation basin to move solids. In still further embodiments the sedimentation basin is free of mechanical devices within the sedimentation basin to move solids to the suction pipes. In still further embodiments the sedimentation basin is free of the presence of rakes, submerged chain drag conveyors, or the like to move or consolidate solids.

In certain embodiments a plurality of suction devices is arranged along the longitudinal axis of the sedimentation basin to remove settled solids from the bottom of the basin. In specific embodiments the suction device is a positive displacement withdrawal device. It is found that such a withdrawal device minimizes degradation of the flocculating agent in the removed solids. In further embodiments the process includes one or more suction devices moveably affixed to enable deployment of the devices along the longitudinal axis of the sedimentation basin to remove settled solids from the bottom of the basin. In this manner, the suction pipes can be moved along the length of the basin to perform suction at various points as needed.

In certain embodiments the sedimentation basin is formed from the excavation or impoundment of earth in an area adjacent to a waste water-generating facility. By forming the basin by impoundment or excavation of earth the capital cost of creating the basin is significantly reduced.

In certain embodiments the flocculation basin has sides substantially equidistant from the center of the basin and a diameter at least about three times the depth of the basin. In specific embodiments the diameter of the flocculation basin is less than about twenty times the depth of the basin.

In certain embodiments the width of the sedimentation basin is about 3 to about 20 times the diameter of the flocculation basin. In further embodiments the sedimentation basin is about 5 to about 10 times the diameter of the flocculation basin.

In certain embodiments the length of the sedimentation basin is about 5 to about 50 times the diameter of the flocculation basin. In further embodiments the length of the sedimentation basin is about 10 to about 20 times the diameter of the flocculation basin.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
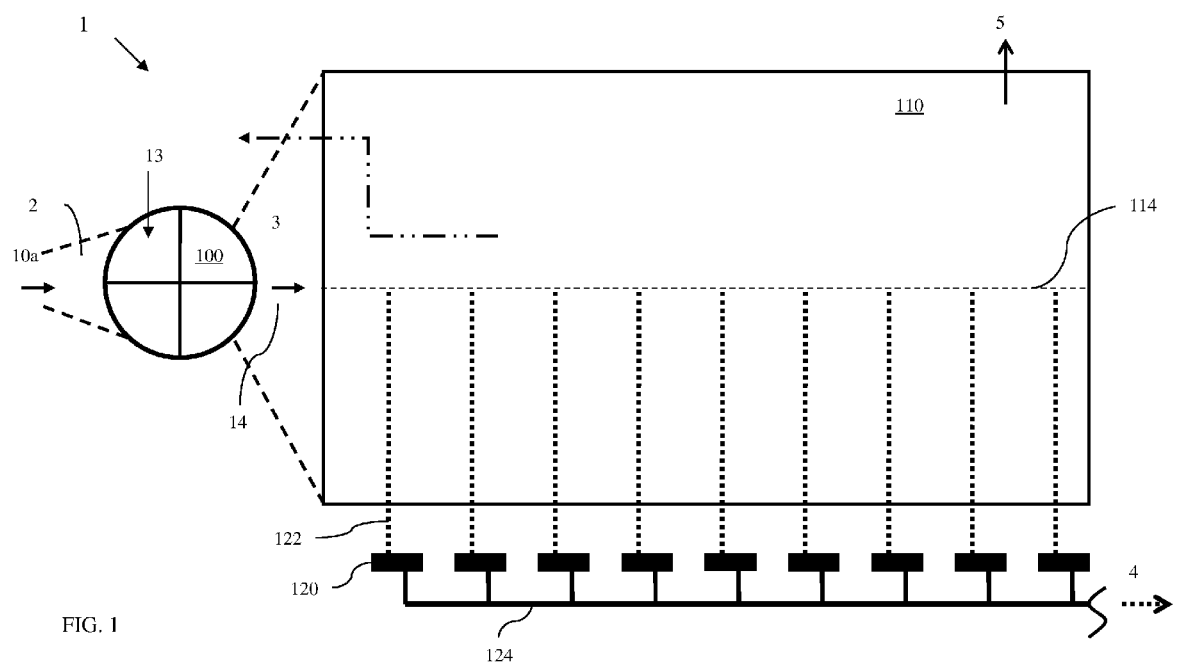
FIG. 1 is a top plan view of an in-situ pond water treatment system according to the present invention.

The present invention is directed to a process and associated systems of treating industrial waste water. The process and systems are most particularly directed to waste water resulting from wet process phosphoric acid production. Such waste water typically contains large quantities of gypsum, along with fluoride and silicon impurities, and other contaminants such as heavy metals. More generally, the process and associated systems taught herein are applicable to all operations in which the contaminants are initially precipitated utilizing a neutralizing substance appropriate for the characteristics of the waste water, such as lime or other reactive alkaline substance if the waste water to be treated is of an acidic character. The precipitated contaminants are produced as finely divided suspended solids that must be separated. The systems of the invention include flocculation and sedimentation basins created, within or near the waste deposit or other contaminated areas, typically by excavation, but also often by impoundment of an area. The basins are designed to have a specific configuration achieving adequate flocculation and separation of the suspended solids. Generally, this would consist of a flocculation basin in which the suspended solids are mixed with an appropriate flocculating agent. More specifically, an anionic polymer of moderate anionic charge is added to the process stream containing the suspended solids in an amount sufficient to promote rapid flocculation and subsequent settling. Optimum flocculation is achieved in the flocculation basin through the combination of physical design parameters such as the diameter and depth of the flocculation basin relative to the desired treatment rate as well and the correct management of the operating conditions in the flocculation basin. These conditions are controlled through the use of recycle streams of both underflow solids and overflow supernatant to maintain optimum flocculation conditions. The flocculated process stream is then overflowed by gravity into a sedimentation basin, the size of which is adequate to promote highly efficient separation of the liquid and solids phases in which suspended solids settle to the bottom of a significantly deeper excavated rectilinear lagoon with sloped sides. The sloped sides promote the settling of the solids to the bottom of the lagoon, at which point they are withdrawn through fixed suction pumps with suction pipes located at appropriate intervals along the longitudinal axis of the rectilinear lagoon. The solids content of the flocculating basin are typically in the 1% to 5% solids content, and the thickened solids withdrawn through the suction pipes typically have a solids content of 7% to 15% solids. The use of positive displacement withdrawal devices is important to maintain the consolidation characteristics of the sediments in their ultimate disposal location. Other withdrawal devices may be substituted in the case where there is little concern for the continued performance of the flocculating agent. This process sequence may be repeated in one or more sequential stages depending on the performance and composition of the individual process water to be treated, and each stage may have specific performance and recovery objectives. For instance, in a multiple stage system, the objective could be to first precipitate predominately calcium fluorosilicate and calcium fluoride, etc, followed by a stage where the objective was to precipitate calcium phosphate. Additional intermediate precipitation and separation stages with specific recovery objectives could also be employed. In the treatment of process water containing unacceptable levels of soluble ammonia, the above system could be employed to remove ammonia through air stripping by the addition of spray devices located in or floating on the sedimentation lagoon. Even without the addition of a spray system, operation of the treatment lagoon at a pH of 9.7 or greater will result in the removal of ammonia through volatilization due to the large surface area available for such activity.

Referring to FIG. 1, there is shown an in-situ phosphoric acid pond water treatment system 1. Partially neutralized pond water 10a is directed via the input stream 2 to the flocculation basin 100 of an in-situ phosphoric acid pond water treatment system 1. The partially neutralized wastewater 10a is mixed in a flocculation basin 100 which is generally or approximately circular in shape. The specific configuration, i.e., the diameter and depth is a function of the substrate material, but is generally in the range of 3' diameter per 1' of depth to 20' diameter per 1' of depth. The flocculation basin 100 is constructed with an opening through which the flocculated slurry flows into the sedimentation basin 110. The partially neutralized pond water 10a is mixed with an appropriate flocculating agent 13 in the flocculation basin 100. The flocculation basin 100 is constructed with an opening through which the flocculated slurry flows into the sedimentation basin 110. As the volume of the flocculated pond water (or more specifically the pond water containing flocculated solids wherein the solids precipitated upon the addition of a neutralizing agent) rises within the flocculation basin 100, the volume of the basin achieves a level sufficient to result in overflow of the flocculated pond water causing the overflow 3 from the flocculation basin 100 to flow into the sedimentation basin 110. The overflow 3 flows into, or is directed into, the sedimentation basin 110 by gravity as depicted by transfer stream 14.

The sedimentation basin 110 is generally rectangular in shape when viewed from above. The basin has sloped sides which meet at a location generally down the centerline of the basin, thus forming the deepest part or bottom 114 of the basin. The flocculated pond water overflow 3 is distributed across the basin where the solids form a precipitate that settles as a sludge 4 in the bottom of the basin with the clarified liquid 5 on top. The sedimentation basin 110 is approximately 3 to 5 times the diameter of the flocculation basin 100 in width.

The length of the sedimentation basin 110 is approximately 5 to 10 times the diameter of the flocculation basin 20. The depth of the sedimentation basin 110 is approximately 20 to 60 feet, but may be more or less depending on the sedimentation characteristics of the flocculated solids. The sedimentation basin 110 is constructed with sloped sides such that an approximate VEE shape is achieved at the deepest point of the basin. The settled solids 4 are withdrawn utilizing stationary pumps 120 which may be of any type suitable for the intended service. A series of suction pipes 122 are arranged at spaced intervals along the bottom 122 of the basin. The suction pipes are connected to one or more pumps 120 which pump the settled solids 4 from the bottom 44 of the basin 110. The solids 4 are then pumped off in a series of pipes 122 for storage, disposal or further treatment. Typically the withdrawn solids 4 are pumped to a disposal location for long term drying and consolidation. Clarified liquid 5 is removed by gravity and routed to the next appropriate process location. The clarified liquid 5, or supernatant, exits the sedimentation by controlled overflow from the sedimentation basin 110. The resulting clear water 5 may then be further treated as an input to a subsequent stage of phosphoric acid pond water treatment system 1 where each system is arranged in series, entering each series via an input stream 2, to allow for multiple stages of treatment. Alternatively, the resulting clarified water 5 may be used in various suitable applications around the plant, or, if sufficiently treated, the clarified water 5 may be discharged.

The employment of the above described process has the additional benefit that because it is constructed within the waste deposit itself, or other contaminated area each stage can be fed by gravity in a cascading arrangement wherein the initial treatment basin is fed by gravity from the raw process water pond at the top of the waste deposit, and overflow from the initial stage flows by gravity to the subsequent stage and so on. The settled sediments are the significantly smaller process stream, comprising approximately 1/10th or less of the process water flow. These solids are pumped at significantly less cost to their disposal location, which may also be within the waste deposit itself.

Figure 2:
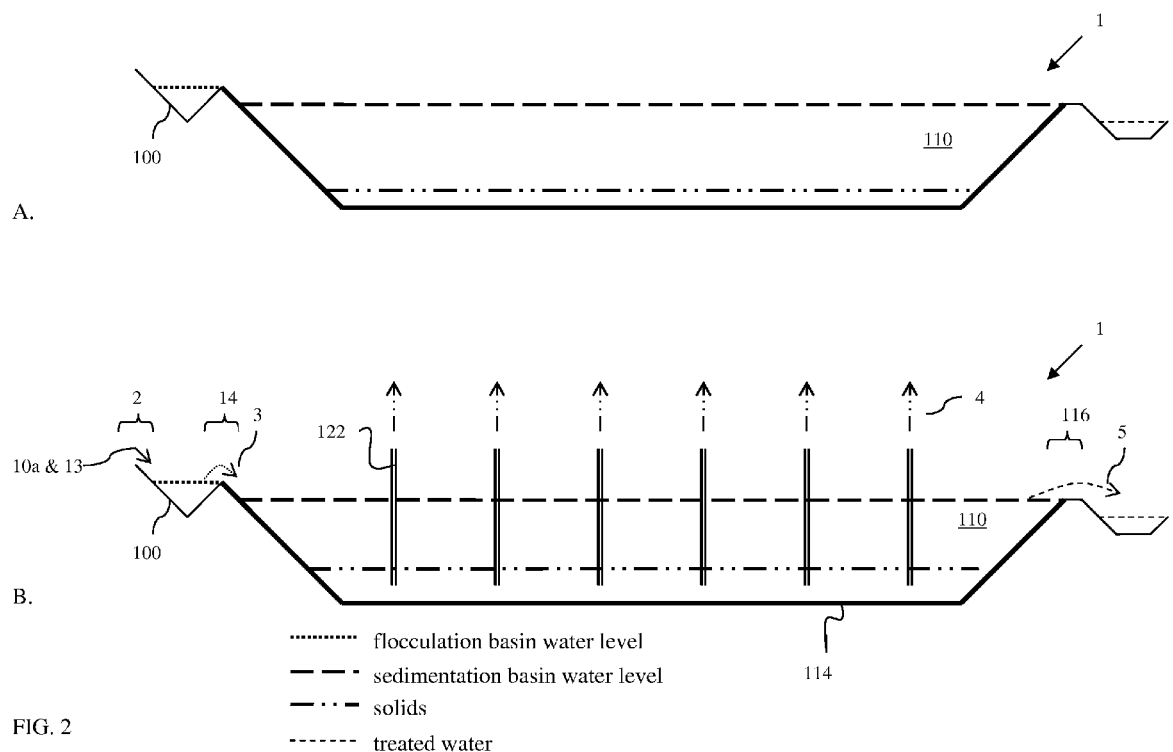
FIG. 2 is a perspective view of the in-situ pond water treatment system of FIG. 1.

Referring to the FIG. 2, there is shown a perspective view of the in-situ phosphoric acid pond water treatment system 1 as shown in FIG. 1. The partially neutralized pond water 10a is directed via the input stream 2 to the flocculation basin 100. Where multiple in-situ phosphoric acid pond water treatment systems 1 are arranged in series, the input to a second or subsequent stage system would be the clarified water 5 output from an earlier stage. The partially neutralized pond water 10a is mixed with an appropriate flocculating agent 13 in the flocculation basin 100. As the level of flocculated pond water rises, it achieves sufficient volume such that it may form an overflow 3 from the flocculation basin 100, exiting through the intermediate stream 14 to flow into the sedimentation basin 110 through the force of gravity.

The flocculated pond water overflow 3 is distributed across the sedimentation basin 110 where the flocculated solids form a precipitate that settle as flocculated solids 4 or sludge in the bottom of the sedimentation basin with the clarified liquid 5 forming the supernatant on the top of the sedimentation basin. The sedimentation basin has a rectangular shape when viewed from above, with sides that slope to meet in the bottom of the basin 114. Where the bottom of the basin is flat, the sides will slope towards one-another as they approach the bottom of the basin, each sloped side terminating at the flat bottom of the basin. The sloped sides facilitate settling of the solids 4 and consolidate the solids at the bottom 114 of the basin. The sloped sides will preferably be situated along the longer side of the structure forming the basin. A series of suction pipes 122 are arranged at spaced intervals along the bottom 114 of the basin. The suction pipes are connected to one or more pumps 120, seen in FIGS. 1 and 3. which pump the settled solids 4 from the bottom 114 of the basin 110. The solids 4 are then pumped off in a series of pipes 124 for storage, disposal or further treatment, as seen in FIG. 1. Typically the withdrawn solids 4 are pumped to a disposal location for long term drying and consolidation or may be recycled as appropriate. The clarified water 5, or supernatant, exits the sedimentation by controlled overflow from the sedimentation basin 110 via an overflow 116. The resulting clarified water 5 may then be further treated as an input to a subsequent stage of phosphoric acid pond water treatment system 1 where each system is arranged in series, entering each series via a pond water line 2, to allow for multiple stages of treatment. Alternatively, the resulting clarified water 5 may be used in various suitable applications in an operating phosphoric acid plant, or, if sufficiently treated, the clarified water 5 may be discharged. Additionally, water leaves the system through evaporation; thus forming a balance between input and output to the system.

Figure 3:
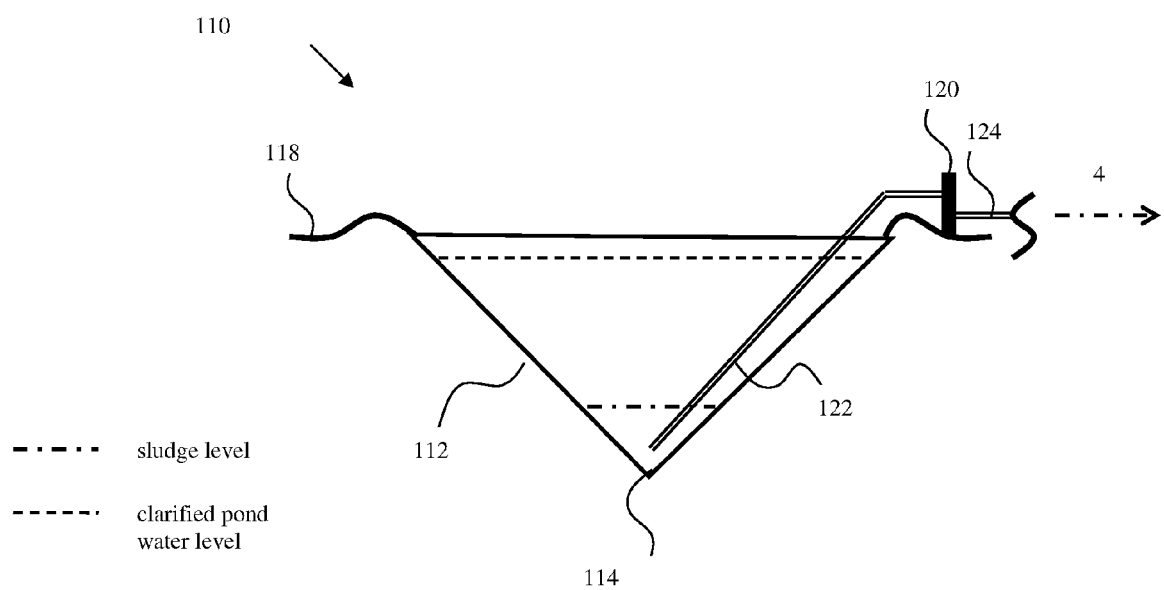
FIG. 3 is an elevation view of a sedimentation basin according to the present invention.

Referring to FIG. 3 there is shown a cross-sectional view of a sedimentation basin 110 of a in-situ phosphoric acid pond water treatment system. The sedimentation basin 110 has sloped walls 112 which meet at the bottom of the basin. The basin is formed from the excavation of the surrounding earth 118. The sludge settles at the bottom of the basin, while the resulting clarified water forms the supernatant at the top of the sedimentation basin 110. Suction pipes 122 are arranged at spaced intervals along the inside of the sloped sides 42 to a point near the bottom 114 of the basin. The suction pipes are connected to one or more pumps 120 which pump the settled sludge 4 from the bottom 114 of the basin 110. The sludge 4 is then pumped off in a series of sludge pipes 124 for storage, recycle, disposal or further treatment.

Figure 4:
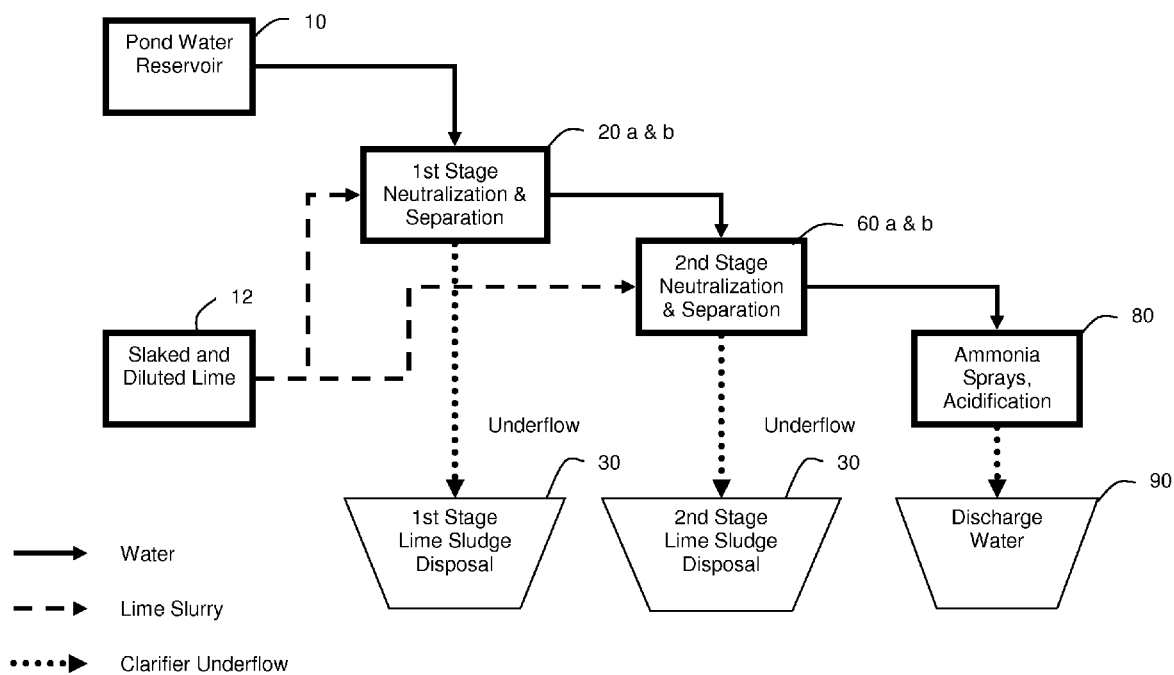
FIG. 4 is a flowchart illustrating a double liming process for treating pond water.

Referring to FIG. 4 there is shown a double liming water treatment process. The process of "double liming" has been the industry standard for treating or purifying pond water. This method consists of adding a calcium compound (such as $CaCO_3$, $Ca(OH)_2$ or $CaO$) to the pond water, in two stages, such that the fluoride, phosphate and other impurities form solid precipitates that settle and are separated from the thus purified water. This method is described in Francis T. Nielsson, ed., Manual of Fertilizer Processing, Marcel Dekker, Inc. (1987), pp. 480 to 482; G. A. Mooney, et al., Removal of Fluoride and Phosphorus from Phosphoric Acid Wastes with Two Stage Line Treatment, Proceedings of the 33rd Industrial Waste Conference, Purdue Univ. (1978); G. A. Mooney et al., Laboratory and Pilot Treatment of Phosphoric Acid Wastewaters, presented at the Joint Meeting of Central Florida and Peninsular, Florida A.I.Ch.E. (1977); and U.S. Pat. Nos. 5,112,499; 4,698,163; 4,320,012; 4,171,342; 3,725,265 and 3,551,332.

During the first neutralization stage lime treatment 20a, lime (CaO) 12 is added to pond water 10 to raise the pH of the solution to about 4 to 5, resulting in the precipitation of fluoride as $CaF_2$ and/or $CaSiF_6$. During this stage it is also thought that some of the hydrofluorosilicic acid present dissociates to HF and $SiF_4$, with the $SiF_4$ hydrolyzing to HF and $SiO_2$. Some phosphate is also precipitated at this stage, as well as some calcium sulphate. The limed water clarified by separation 20b, being separated into a clarified overflow stream and an underflow containing the precipitated solids. The sludge ($CaF_2$, $CaSiF_6$, $Ca_3(PO_4)_2$, $CaSO_4 \cdot 2H_2O$, and other compounds) produced at this stage is a granular, crystalline material that settles fairly rapidly and can be de-watered to about 30% solids. The sludge can be sent to disposal 30 at the plant gypsum stack.

In the second neutralization stage 60a, additional lime, is added to the clarified liquid from the first neutralization stage 20a to obtain a pH of about 8-10. In the second separation stage 60b the remaining phosphates and fluorides are precipitated along with sulfate and many of the metals. The sludge in this stage has poor settling and thickening properties, due to the hydroxide nature of many of the compounds, and rarely achieves more than 5%-7% solids by weight. The sludge from this second stage 60b is normally deposited in large lagoons to allow for additional de-watering. If in this treatment, the second neutralization stage 60a clarified water contains unacceptable levels of soluble ammonia, the second neutralization stage system 60a can be operated at a higher pH, from pH 10 to 12, to increase the unionized ammonia concentration, raising its volatility. The increased vapor pressure of the ammonia in solution facilitates its removal through air stripping by the addition of spray devices located in or floating on the sedimentation lagoon. Even without the addition of a spray system, operation of the treatment lagoon at a pH of 9 to 10 or greater results in the removal of ammonia through volatilization due to the large surface area available for such activity.

$NH_4^+ + OH^- \rightarrow H_2O + NH_3$ (Unionized and volatile)

The water stream can then be treated with acid to produce dischargeable water. The quantity of clear water that can be obtained from a double liming process is about 50%-70% of the feed volume. As an alternative, liming procedures can be carried out in a single stage.

Figure 5:
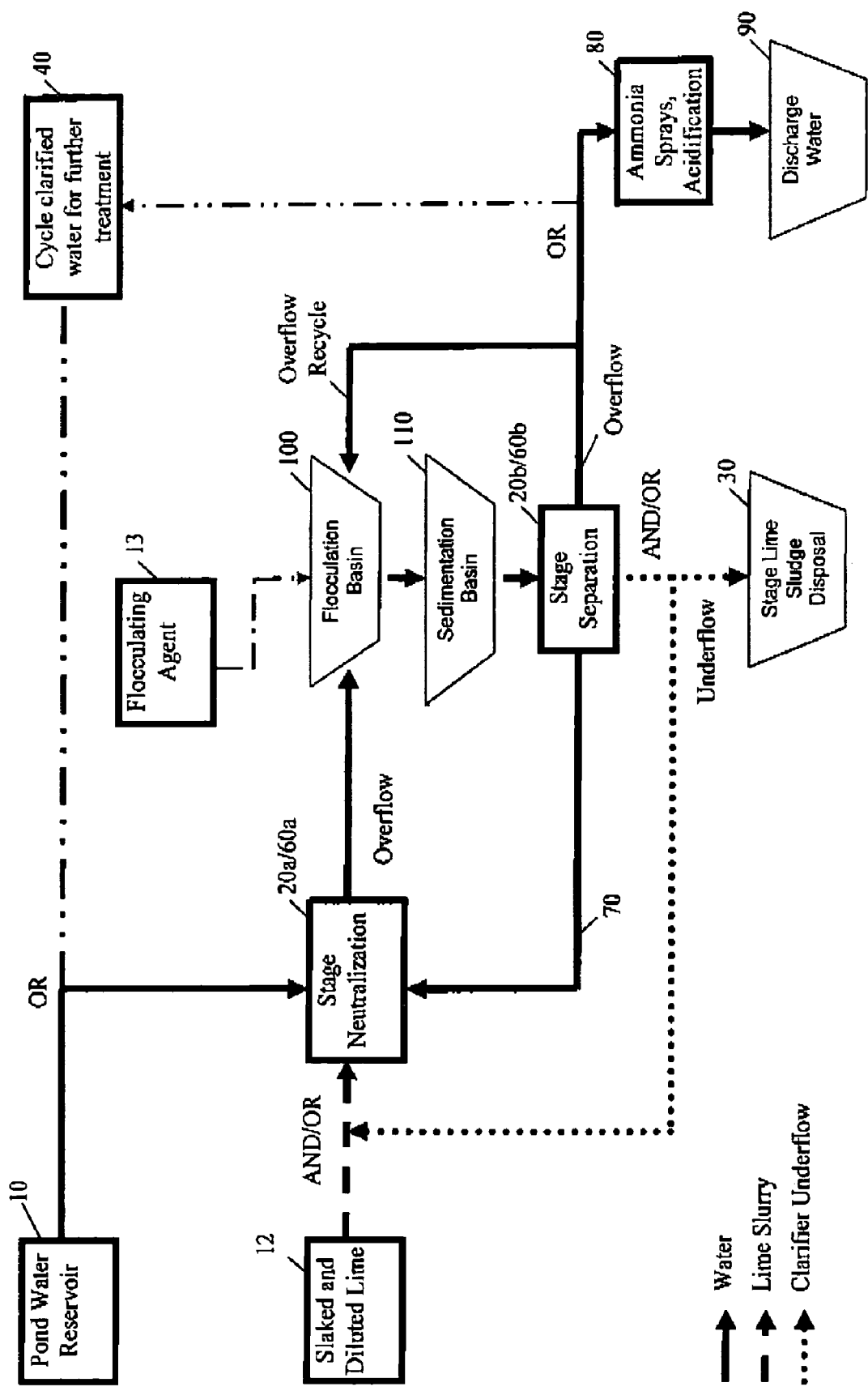
FIG. 5 is a flowchart illustrating a single stage of water treatment using an in-situ wastewater treatment pit according to the present invention.

Turning to FIG. 5 there is shown a stage of an in-situ phosphoric acid treatment process according to the invention. The process takes raw, untreated wastewater 10 and mixes it with an amount of neutralizing base material 12, such as hydrated lime slurry, in a suitable reaction vessel with the purpose of raising the pH 20a to approximately 3 to 5. This partially neutralized slurry is then admixed with a flocculating agent 13 in the flocculating basin 100 with the purpose of forming a more rapidly settling slurry. The resulting flocculated mixture is introduced by overflow from the flocculation basin 100 into the sedimentation basin 110 where the liquid and solids phases separate 20b. The solid phase 4, or "underflow" is withdrawn through submerged suction pipes and deposited into a sludge disposal area for drying and consolidation or partially recycled as may be appropriate. The clarified water stream 5, can be cycled, or cascaded down, for an additional stage of treatment 40, as indicated in the flow sheet by the loop back of the overflow stream. Additionally, the overflow can be cycled back to the flocculation basin to control the turbulence in the basin. Where the overflow stream from the stage separation 20b step is directed to additional treatment 70 as an input to the stage neutralization 60a stream, it is not mixed with untreated pond water 10, but rather is cascaded or directed for additional treatment as a sole input to the subsequent treatment stage 60. Such treatment is illustrated with reference to a two-stage treatment system as outlined in FIG. 6.

Figure 6:
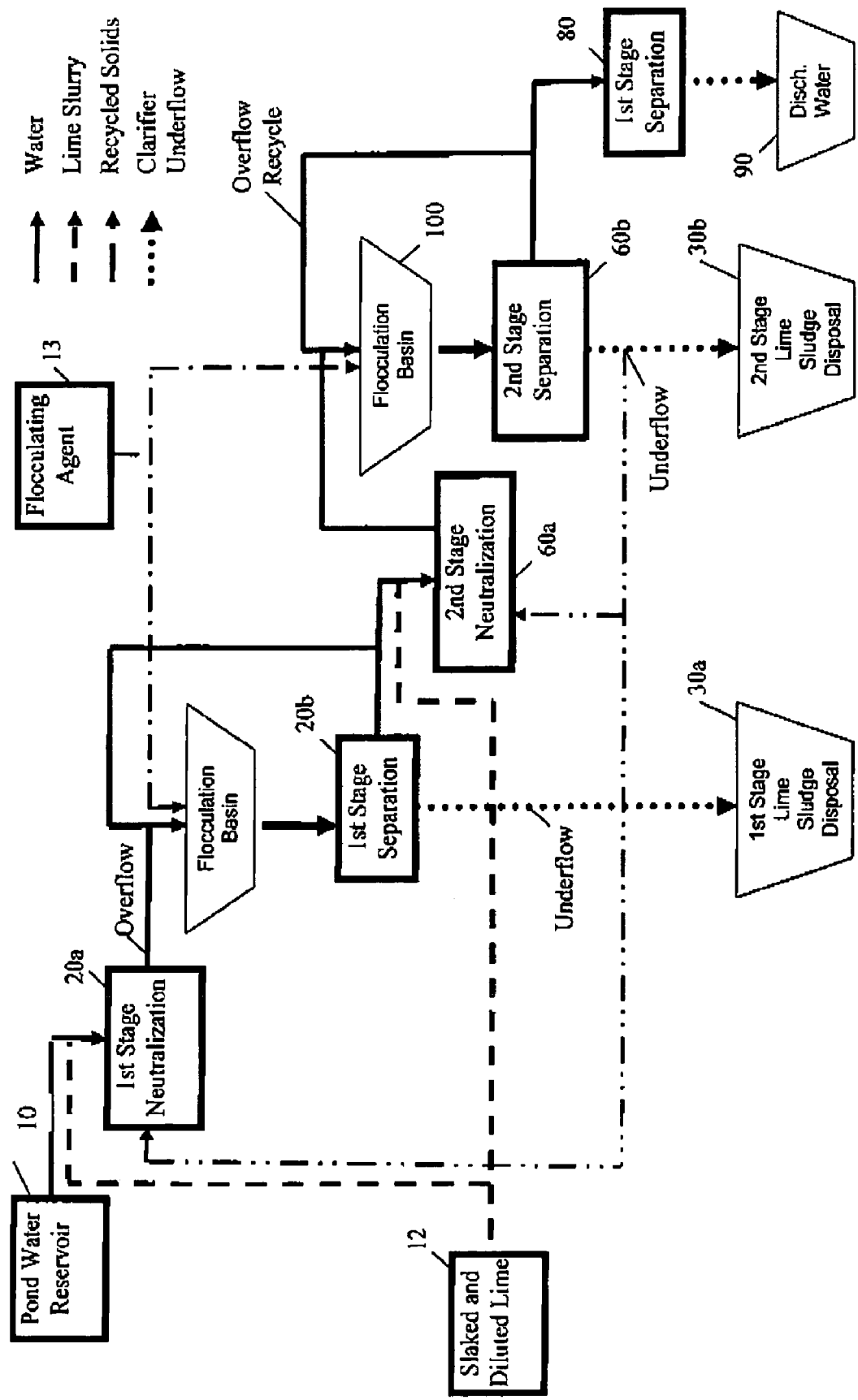
FIG. 6 is a flowchart illustrating a two-stage water treatment scheme using an in-situ wastewater treatment pit according to the present invention. In the depicted process, the clarified water from the second stage is treated to vaporize ammonia and then further treated with acid to reduce the pH to acceptable levels prior to discharge.

In FIG. 6 the overflow from the first stage separation 20b is cascaded as an input to the second stage neutralization 60a. At the second stage neutralization 60a, additional quantities of base 12 and flocculating agent 13 are added to the introduced stream in the flocculation basin 100. The overflow stream enters the second stage separation 60b where solids settled to the bottom of a sedimentation basin 110 while the overflow is directed for additional treatment 70 including reducing ammonia levels through vaporization, reducing conductivity and reducing pH by acidification through addition of agent such as $H_2SO_4$. The resulting discharge water 90 may then be released.

The employment of the above described process has the additional benefit that because it can be constructed within the waste deposit itself, or other contaminated area each stage can be fed by gravity in a cascading arrangement wherein the initial treatment basin is fed by gravity from the raw process water pond at the top of the waste deposit, and overflow from the initial stage flows by gravity to the subsequent stage and so on. The settled sediments are the significantly smaller process stream, comprising approximately 1/10th or less of the process water flow. These solids are pumped at significantly less cost to their disposal location, which may also be within the waste deposit itself.

Employment of the above described process for the treatment of phosphate production waste process water will be more efficient in that when designing conventional process equipment to complete the above unit operations, compromises are a necessary consequence between capital cost and performance or unit operation efficiency. In the above described process, such compromises are unnecessary, and individual unit operation can be designed to maximum efficiency. The above process description changes the paradigm between operating performance and capital costs such that maximum operational efficiency can now be the design basis.

The disclosure of all publications cited above are expressly incorporated herein by reference, each in its entirety, to the same extent as if each were incorporated by reference individually.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A process for the treatment of waste water comprising the steps of:
    admixing partially-treated waste water containing precipitated impurities with a flocculating agent in a flocculation basin;
    directing the admixed waste water to an elongated sedimentation basin having a plurality of suction devices disposed along the longitudinal axis thereof wherein the sedimentation basin comprises a pair of sloped sides to consolidate settled solids at the bottom of the basin, and is free of mechanical devices to move or consolidate solids;
    allowing flocculated solids in the waste water to settle to the bottom of the sedimentation basin and form treated water;
    removing the settled solids from the bottom of the sedimentation basin wherein the suction devices are positive displacement withdrawal devices utilizing one or more stationary pumps to remove settled solids, whereby the withdrawal devices minimize degradation of the flocculating agent in the removed solids; and
    directing the treated water from the sedimentation basin.

2. The process according to claim 1 wherein the sedimentation basin is substantially rectangular in shape when viewed from above.

3. The process according to claim 1 wherein the admixed waste water is directed to the sedimentation basin by overflow from the flocculation basin.

4. The process according to claim 1 wherein the sedimentation basin is free of the presence of rakes to move or consolidate solids.

5. The process according to claim 1 further comprising a plurality of suction devices arranged at spaced intervals along the longitudinal axis of the sedimentation basin to remove settled solids from the bottom of the basin.

6. The process according to claim 1 wherein the sedimentation basin is formed from the excavation or impoundment of earth in an area adjacent to a waste water-generating facility.

7. The process according to claim 1 wherein the flocculation basin has sides substantially equidistant from the center of the basin and a diameter at least about three times the depth of the basin.

8. The process according to claim 7 wherein the diameter of the flocculation basin is less than about twenty times the depth of the basin.

9. The process according to claim 1 wherein the width of the sedimentation basin is about 3 to about 20 times the diameter of the flocculation basin.

10. The process according to claim 1 wherein the length of the sedimentation basin is about 5 to about 50 times the diameter of the flocculation basin.

11. The process according to claim 1 further comprising the step of adjusting the pH of the waste water to precipitate impurities in the waste water prior to the addition of the flocculation agent.

12. The process according to claim 11 wherein the pH is increased.

13. The process according to claim 12 wherein the pH is increased by the addition of lime.

14. The process according to claim 12 further comprising the addition of an acid to the treated water to adjust the pH of the treated water toward neutrality.

15. The process according to claim 14 wherein the acid is sulfuric acid.

16. The process according to claim 11 further comprising the step of recycling the treated water into waste water to be treated in the flocculation basin, whereby the recycled treated water adjusts the percentage solids in the water being treated.

17. The process according to claim 11 wherein the step of adjusting the pH of the water is performed by the addition of a base in a quantity sufficient to result in a pH of about 9.0 to about 12.0 and further comprising the step of holding the water in the sedimentation basin to allow volatilization of ammonia in the water.

18. The process according to claim 17 further comprising the step of performing air-stripping on the holding water to facilitate the volatilization of ammonia.

19. The process according to claim 1 wherein the treated water is processed by reverse osmosis to remove residual impurities.

20. A process for the treatment of waste water comprising the steps of:
    adjusting the pH of the waste water to precipitate impurities;
    admixing partially-treated waste water containing the precipitated impurities with a flocculating agent in a flocculation basin;
    directing the admixed waste water to an elongated sedimentation basin having a plurality of suction devices disposed along the longitudinal axis thereof wherein the sedimentation basin comprises a pair of sloped sides to consolidate settled solids at the bottom of the basin, and is free of mechanical devices to move or consolidate solids;

allowing flocculated solids in the waste water to settle to the bottom of the sedimentation basin and form treated water;

removing the settled solids from the bottom of the sedimentation basin wherein the suction devices are positive displacement withdrawal devices utilizing one or more stationary pumps to remove settled solids, whereby the withdrawal devices minimize degradation of the flocculating agent in the removed solids; and directing the treated water from the sedimentation basin.

21. The process according to claim 20 wherein the pH of the waste water is increased.

22. The process according to claim 21 further comprising the addition of an acid to the treated water to adjust the pH of the treated water toward neutrality.

23. The process according to claim 20 wherein the sedimentation basin is substantially rectangular in shape when viewed from above.

24. The process according to claim 20 wherein the admixed waste water is directed to the sedimentation basin by overflow from the flocculation basin.

25. The process according to claim 20 wherein the sedimentation basin is free of the presence of rakes to move or consolidate solids.

26. The process according to claim 20 further comprising a plurality of suction devices arranged at spaced intervals along the longitudinal axis of the sedimentation basin to remove settled solids from the bottom of the basin.

27. The process according to claim 20 wherein the sedimentation basin is formed from the excavation or impoundment of earth in an area adjacent to a waste water-generating facility.

28. The process according to claim 20 further comprising the step of recycling treated waste water into waste water to be treated in the flocculation basin, whereby the recycled treated waste water adjusts the percentage solids in the water being treated.

29. The process according to claim 20 wherein the step of adjusting the pH of the water is performed by the addition of a base in a quantity sufficient to result in a pH of about 9.0 to about 12.0 and further comprising the step of holding the water in the sedimentation basin to allow volatilization of ammonia in the water.

30. The process according to claim 20 wherein the treated water is processed by reverse osmosis to remove residual impurities.

31. A process for the treatment of waste water comprising the steps of:

adjusting the pH of the waste water;

admixing a flocculating agent with the waste water in a flocculation basin;

directing the flocculated waste water to an elongated sedimentation basin, wherein the sedimentation basin has a plurality of suction devices disposed along the longitudinal axis wherein the sedimentation basin comprises a pair of sloped sides to consolidate settled solids at the bottom of the basin, and is free of mechanical devices to move or consolidate solids;

allowing solids in the flocculated waste water to settle to the bottom of the sedimentation basin and form first-stage clarified water;

removing the settled solids from the bottom of the sedimentation basin wherein the suction devices are positive displacement withdrawal devices utilizing one or more stationary pumps to remove settled solids, whereby the withdrawal devices minimize degradation of the flocculating agent in the removed solids;

directing the first-stage clarified water from the sedimentation basin to a reaction vessel;

adjusting the pH of the first-stage clarified water in a reaction vessel;

admixing a flocculating agent with the first-stage clarified water in a flocculation basin;

directing the flocculated water to a second elongated sedimentation basin;

allowing solids in the flocculated water to settle to the bottom of the second sedimentation basin and form treated water, wherein the second sedimentation basin has a plurality of suction devices disposed along the longitudinal axis;

removing the settled solids from the bottom of the second sedimentation basin; and directing the treated water from the second sedimentation basin.

32. The process according to claim 31 wherein the pH is increased in at least one of the pH increasing steps by the addition of lime.

33. The process according to claim 31 wherein the step of adjusting the pH of the waste water is performed by the addition of a base in a quantity sufficient to result in a pH of about 3.0 to about 5.0.

34. The process according to claim 31 wherein the step of adjusting the pH of the first-stage water is performed by the addition of a base in a quantity sufficient to result in a pH of about 8.0 to about 10.0.

35. The process according to claim 31 wherein the step of adjusting the pH of the first-stage clarified water is performed by the addition of a base in a quantity sufficient to result in a pH of about 9.0 to about 12.0 and further comprising the step of holding the water in the sedimentation basin to allow volatilization of ammonia in the water.

36. The process according to claim 31 wherein the treated water is processed by reverse osmosis to remove residual impurities.

37. The process according to claim 31 wherein the sedimentation basins are substantially rectangular in shape when viewed from above.

38. The process according to 31 wherein the sedimentation basins are free of the presence of rakes to consolidate solids.

39. The process according to claim 31 further comprising a plurality of suction devices arranged at spaced intervals along the longitudinal axis of the sedimentation basins to remove settled solids from the bottom of the basins.

40. The process according to claim 31 further comprising the step of recycling first-stage clarified water into waste water to be treated in the flocculation basin, whereby the recycled treated waste water adjusts the percentage solids in the water being treated.

* * * * *